US012763047B2

(12) United States Patent
Liao

(10) Patent No.: US 12,763,047 B2
(45) Date of Patent: Oct. 13, 2026

(54) CLAMPING ROD FRAME

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 283 days.

(21) Appl. No.: 18/760,272

(22) Filed: Jul. 1, 2024

(65) Prior Publication Data

US 2026/0004756 A1 Jan. 1, 2026

(51) Int. Cl.
*G10D 13/10* (2020.01)
*F16B 2/10* (2006.01)

(52) U.S. Cl.
CPC ............... *G10D 13/28* (2020.02); *F16B 2/10* (2013.01)

(58) Field of Classification Search
CPC .......... G10D 13/28; F16B 2/10; F16B 7/0493
See application file for complete search history.

(56) References Cited

U.S. PATENT DOCUMENTS 9,310,021 B2 4/2016 Hennessey et al.
9,633,635 B2 4/2017 Liao

FOREIGN PATENT DOCUMENTS

CN 210122979 U * 3/2020 ............ G10D 13/28

* cited by examiner

*Primary Examiner* — Kimberly R Lockett
(74) *Attorney, Agent, or Firm* — Muncy, Geissler, Olds & Lowe, P.C.

(57) ABSTRACT

A clamping rod frame includes a first clamping block, a second clamping block, a first locking member, a vertical rotating joint, a second locking member, a horizontal rotating joint, a third locking member, and a mounting rod. The first and second clamping blocks are pressed by the first locking member to clamp a vertical rod. The vertical rotating joint includes first and second vertical joints relatively rotating and pressed and fixed by the second locking member, and the first vertical joint is connected to the second clamping block. The horizontal rotating joint includes first and second horizontal joints relatively rotating and pressed and fixed by the third locking member, and the first horizontal joint is connected to the second vertical joint. The mounting rod is inserted into a mounting ring of the third locking member and pressed and fixed by a groove of the second horizontal joint.

10 Claims, 5 Drawing Sheets

CLAMPING ROD FRAME

FIELD OF THE INVENTION

The present invention relates to support structures for musical instruments and, in particular, to a clamping rod frame for clamping a vertical rod for the musical instruments.

BACKGROUND OF THE INVENTION

When playing, a variety of musical instruments and a music sheet will need to be set up for the performers to use. The performers will use a clamp disclosed in U.S. Pat. No. 9,633,635 B2 to combine various musical instruments such as cymbals, drums, cowbells, etc., and the music sheet on the vertical rod, and the vertical rod is set on a tripod to be placed beside the performer.

An operation method of U.S. Pat. No. 9,633,635 B2 mainly involves rotating a screw locking member, pressing an outer curved surface of a movable member, allowing the movable member to rotate relative to a fixed member, and clamping a vertical rod by allowing the fixed member to come close to the movable member, so as to satisfy the need for rapid assembly and disassembly.

However, in the process of pressing the outer curved surface of the movable member by the screw locking member, the screw locking member moves relative to the outer curved surface under friction, which will wear out the outer curved surface and cause deformation of the outer curved surface. When the deformation is serious, the clamp will not be able to provide sufficient clamping force and cannot be used, and the outer curved surface of the movable member, once it is worn out, it can only be replaced as a whole set, which does not have any value of repair, so obviously the service life cannot satisfy the demand of the use.

In addition, for the purpose of performance, the player may also use a rotary joint as disclosed in U.S. Pat. No. 9,310,021 B2. The rotary joint has a lower joint and an upper joint, and the upper and lower joints can be connected to a vertical rod respectively, and after rotating and loosening knobs of the rotary joints, the user can rotate and change a relative angle of the lower joint and the upper joint, thereby adjusting a relative inclination angle of the two vertical rods to meet the needs of playing.

The rotary joint as mentioned above requires the use of two vertical rods to adjust the relative inclination angle, and if used with the aforementioned clamp, the possibility of loosening of the clamp will increase due to the increase in weight.

SUMMARY OF THE INVENTION

The main object of the present invention is to disclose a clamping rod frame that has a long service life and provides adjustment of the tilt angle.

To achieve above objectives, the present invention provides a clamping rod frame provided for clamping a vertical rod, including a first clamping block, a second clamping block, a first locking member, a vertical rotating joint, a second locking member, a horizontal rotating joint, a third locking member, a mounting rod. The first clamping block includes a first clamping surface adjacent to the vertical rod, the second clamping block includes a second clamping surface adjacent to the vertical rod, the first clamping block and the second clamping block pivotally connected together through a pivot so that the first clamping block and the second clamping block rotate relative to each other to allow the first clamping surface and the second clamping surface close together, the first clamping block includes a first through hole, and the second clamping block includes a second through hole corresponded to the first through hole. The first locking member includes a first screw locking head and a first bolt, the first bolt passes through the second through hole and the first through hole and is screw locked with the first screw locking head, the first screw locking head and the first bolt press the first clamping block close to the second clamping block, so that the vertical rod is sandwiched between the first clamping surface and the second clamping surface.

The vertical rotating joint includes a first vertical joint and a second vertical joint overlapping and relatively rotating to each other, and the first vertical joint is connected to the second clamping block. The second locking member includes a second screw locking head and a second bolt, the second bolt passes through the second vertical joint and the first vertical joint and is screw locked with the second screw locking head, and the second screw locking head and the second bolt press the first vertical joint and the second vertical joint to clamp and fix each other.

The horizontal rotating joint includes a first horizontal joint and a second horizontal joint overlapping and relatively rotating to each other, and the first horizontal joint is connected to the second vertical joint. The third locking member includes a third screw locking head and a third bolt, the third bolt passes through the second horizontal joint and the first horizontal joint and is screw locked with the third screw locking head, the third screw locking head and the third bolt press the first horizontal joint and the second horizontal joint to clamp and fix each other, and the third bolt is provided with a mounting ring at an end opposite to the third screw locking head. The second horizontal joint is provided with an accommodating slot and a groove, the accommodating slot correspondingly accommodates the mounting ring, the groove crosses the accommodation slot and penetrates the second horizontal joint, and the groove is in a direction identical to an axial direction of the mounting ring. The mounting rod is inserted into the mounting ring and pressed and fixed by the groove when the first horizontal joint and second horizontal joint are clamped.

Accordingly, the mounting rod of the invention can be used to set up various musical instruments and auxiliary equipment, and has degrees of rotational freedom in two directions through the vertical rotating joint and the horizontal rotating joint, so the tilt angle can be freely adjusted. Additionally, by pressing the first clamping block and the second clamping block closer together through the first screw locking head and the first bolt, the first clamping surface and the second clamping surface sandwich the vertical rod. Moreover, once the first screw locking head and the first bolt are damaged, which can be directly replaced to increase the service life.

DETAILED DESCRIPTION OF THE PREFERRED EMBODIMENTS

The technical contents of the present invention are described as follows with reference to the accompanying drawings.

Figure 1:
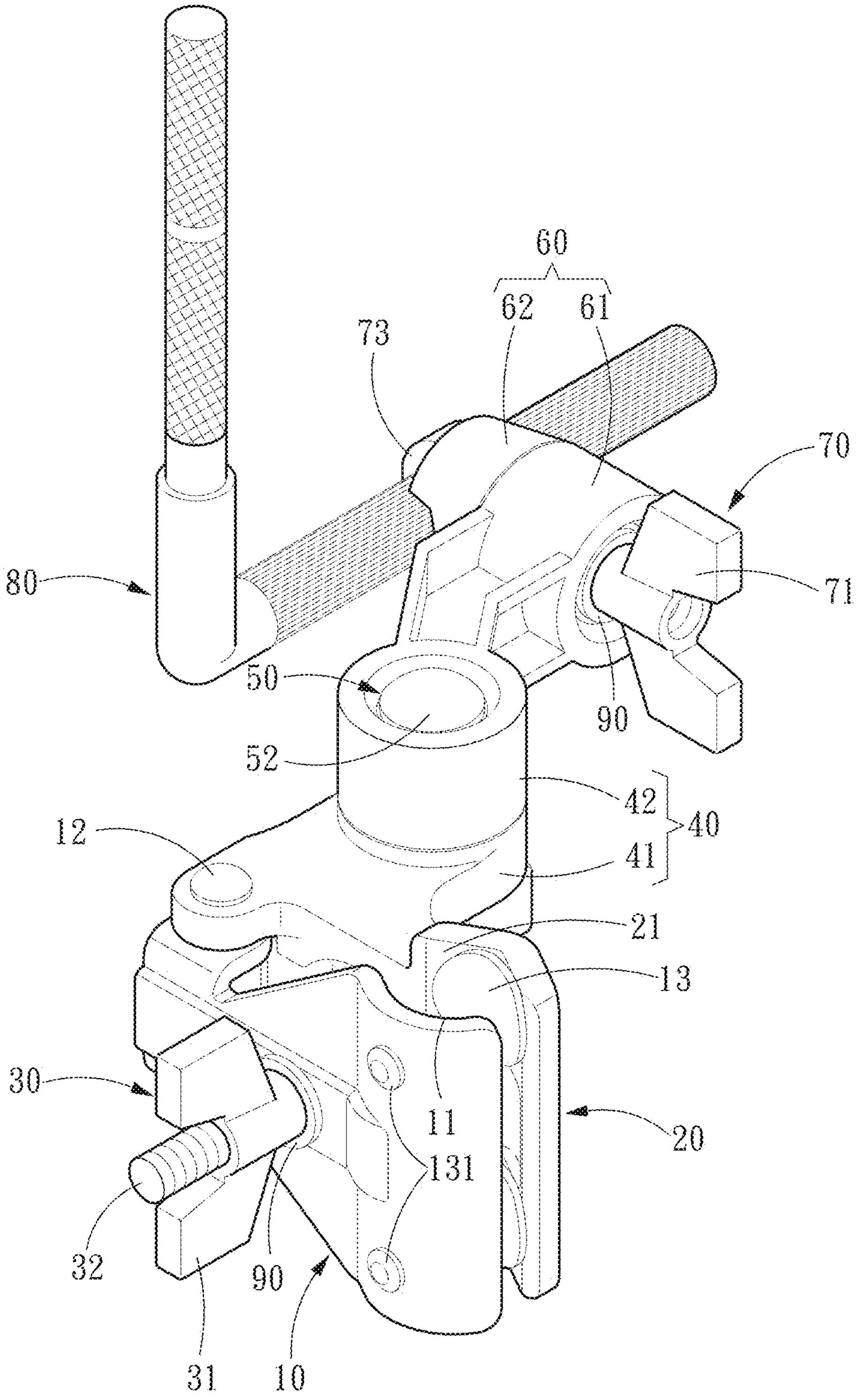
FIG. 1 is a schematic view of the three-dimensional structure of the present invention.
Figure 2:
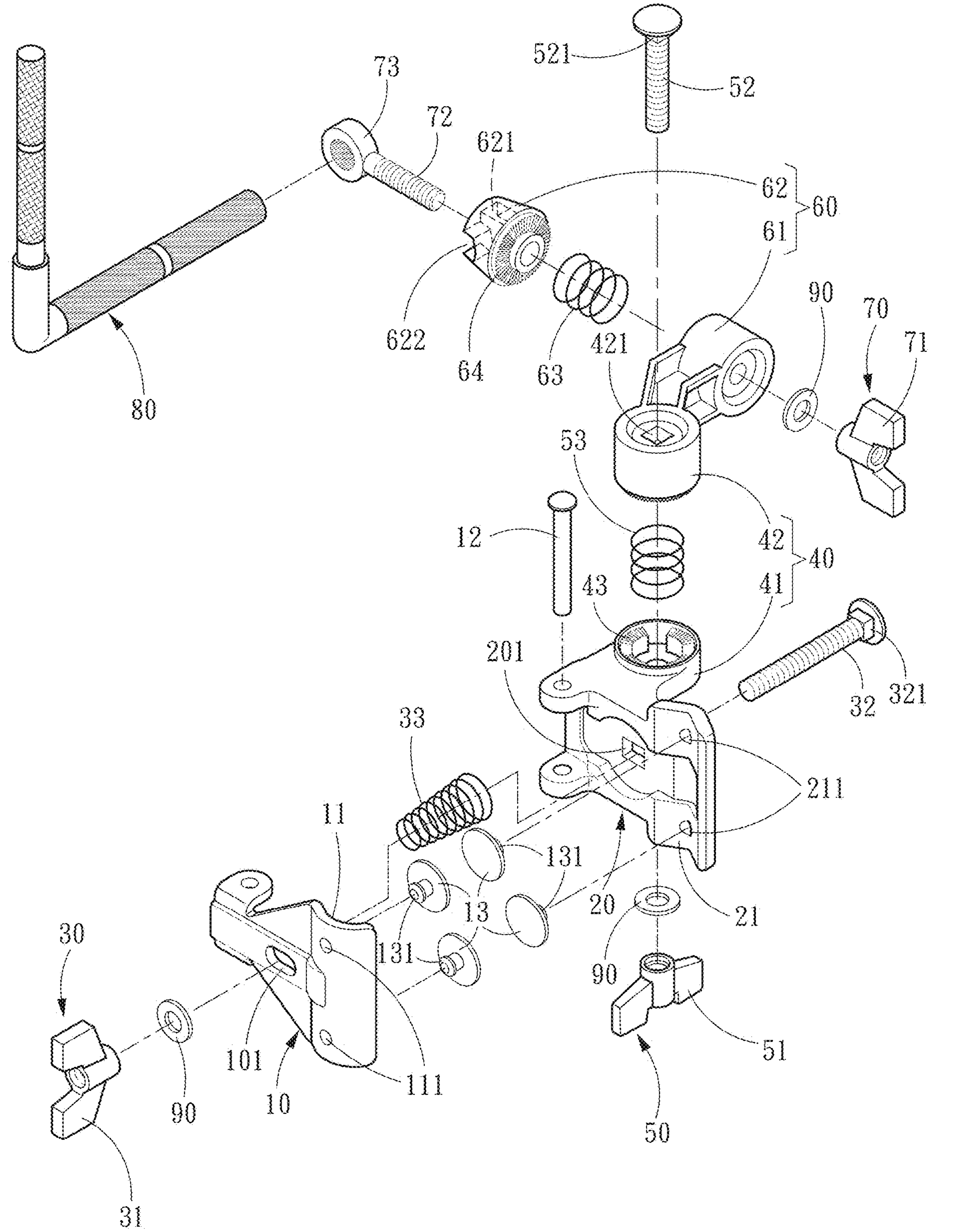
FIG. 2 is an exploded diagram of the present invention.
Figure 3:
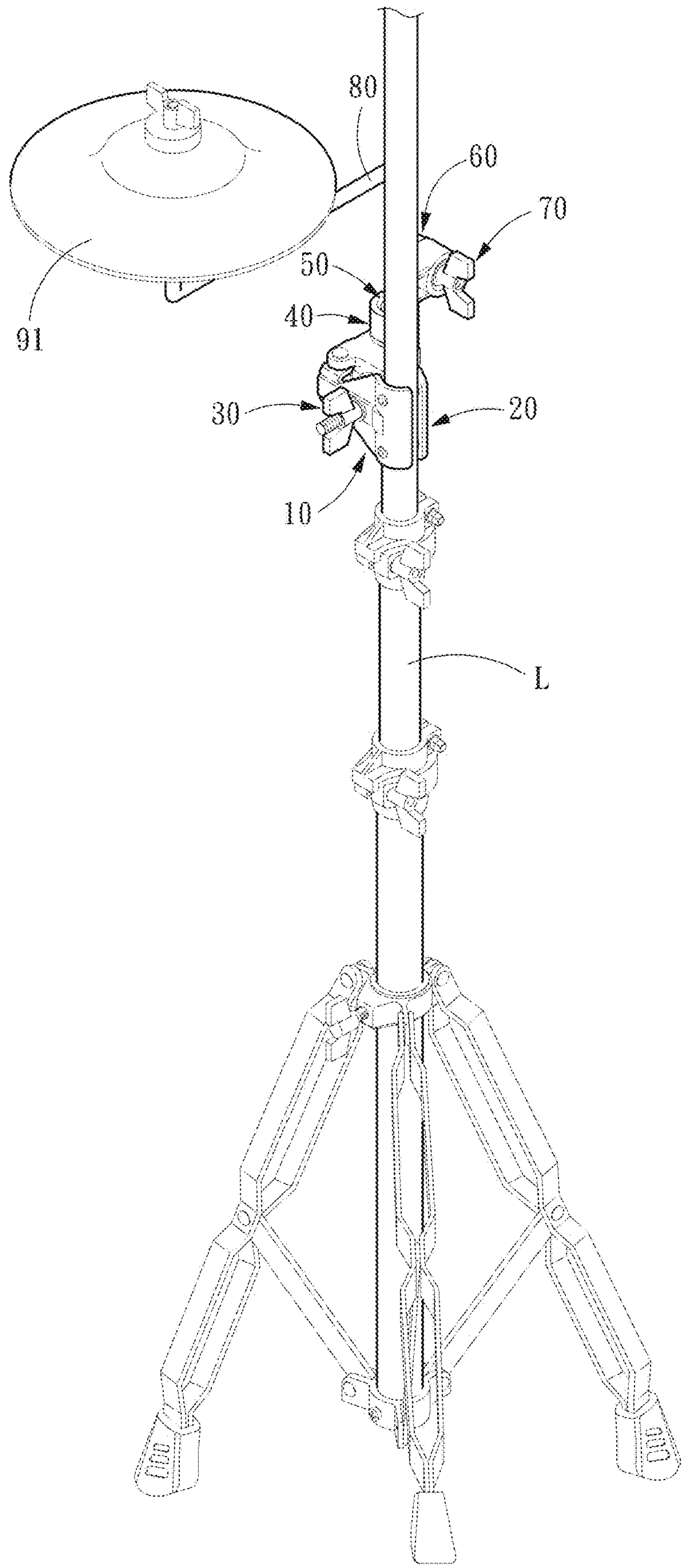
FIG. 3 is a first schematic view for use of the present invention.

Please refer to FIG. 1, FIG. 2 and FIG. 3, the present invention provides a clamping rod frame for clamping a vertical rod L. The clamping rod frame includes a first clamping block 10, a second clamping block 20, a first locking member 30, a vertical rotating joint 40, a second locking member 50, a horizontal rotating joint 60, a third locking member 70, and a mounting rod 80. The first clamping block 10 includes a first clamping surface 11 adjacent to the vertical rod L, the second clamping block 20 includes a second clamping surface 21 adjacent to the vertical rod L, and the first clamping block 10 and the second clamping block 20 are pivotally connected together through a pivot 12, so that the first clamping block 10 and the second clamping block 20 rotate relative to each other, allowing the first clamping surface 11 and the second clamping surface 21 close together. The first clamping block 10 includes a first through hole 101 and the second clamping block 20 includes a second through hole 201, and a position of the first through hole 101 corresponds to a position of the second through hole 201. Preferably, the first through hole 101 is an elongated hole.

The first locking member 30 includes a first screw locking head 31 and a first bolt 32. The first bolt 32 passes through the second through hole 201 and the first through hole 101 and is screw locked with the first screw locking head 31. The first screw locking head 31 and the first bolt 32 press the first clamping block 10 close to the second clamping block 20, so that the vertical rod L is sandwiched between the first clamping surface 11 and the second clamping surface 21. In one embodiment, in order to increase the stability of clamping, the first clamping surface 11 and the second clamping surface 21 are respectively provided with a plurality of clamping soft pads 13 and a plurality of through holes 111, 211. The plurality of clamping soft pads 13 of the first clamping surface 11 and the second clamping surface 21 are respectively provided with a protruding post 131 to engage with each of the plurality of through holes 111, 211. In one embodiment, the second through hole 201 is in a shape of rectangular, and the first bolt 32 includes a rectangular block 321 provided for the second through hole 201 being correspondingly engaged.

The vertical rotating joint 40 includes a first vertical joint 41 and a second vertical joint 42. The first vertical joint 41 and the second vertical joint 42 overlap and rotate relatively, and the first vertical joint 41 is connected to the second clamping block 20.

The second locking member 50 includes a second screw locking head 51 and a second bolt 52. The second bolt 52 passes through the second vertical joint 42 and the first vertical joint 41 and is screw locked with the second screw locking head 51. The second screw locking head 51 and the second bolt 52 press the first vertical joint 41 and the second vertical joint 42 to clamp and fix each other. In one embodiment, in order to increase the stability, the first vertical joint 41 and the second vertical joint 42 are respectively provided with a first concave and convex engaging structure 43 on contact surfaces thereof. The second bolt 52 may be provided with a rectangular block 521, and the second vertical joint 42 includes a rectangular through hole 421 for the rectangular block 521 being correspondingly engaged.

The horizontal rotating joint 60 includes a first horizontal joint 61 and a second horizontal joint 62. The first horizontal joint 61 and the second horizontal joint 62 overlap and rotate relatively, and the first horizontal joint 61 is connected to the second vertical joint 42.

The third locking member 70 includes a third screw locking head 71 and a third bolt 72. The third bolt 72 passes through the second horizontal joint 62 and the first horizontal joint 61 and is screw locked with the third screw locking head 71. The third screw locking head 71 and the third bolt 72 press the first horizontal joint 61 and the second horizontal joint 62 to clamp and fix each other. In one embodiment, in order to increase the stability, the first horizontal joint 61 and the second horizontal joint 62 are respectively provided with a second concave and convex engaging structure 64 on contact surfaces thereof. The third bolt 72 is provided with a mounting ring 73 at one end opposite to the third screw locking head 71, the second horizontal joint 62 is provided with an accommodation slot 621 and a groove 622, the accommodation slot 621 correspondingly accommodates the mounting ring 73, the groove 622 crosses the accommodation slot 621 and penetrates the second horizontal joint 62, and the groove 622 is in a direction identical with an axial direction of the mounting ring 73.

The mounting rod 80 is inserted into the mounting ring 73 and is pressed and fixed by the groove 622 when the first horizontal joint 61 and second horizontal joint 62 are clamped (as shown in FIG. 1).

In order to prevent the first bolt 32, the second bolt 52, and the third bolt 72 from loosening, the first bolt 32 is inserted into a conical spring 33, and a conical direction of the conical spring 33 is toward the first screw locking head 31. The second bolt 52 and the third bolt 72 are respectively inserted into a compression spring 53, 63. In addition, in order to extend service life, the first screw locking head 31, the second screw locking head 51 and the third screw locking head 71 respectively press the first clamping block 10, the first vertical joint 41 and the first horizontal joint 61 by a baffle 90.

Figure 4:
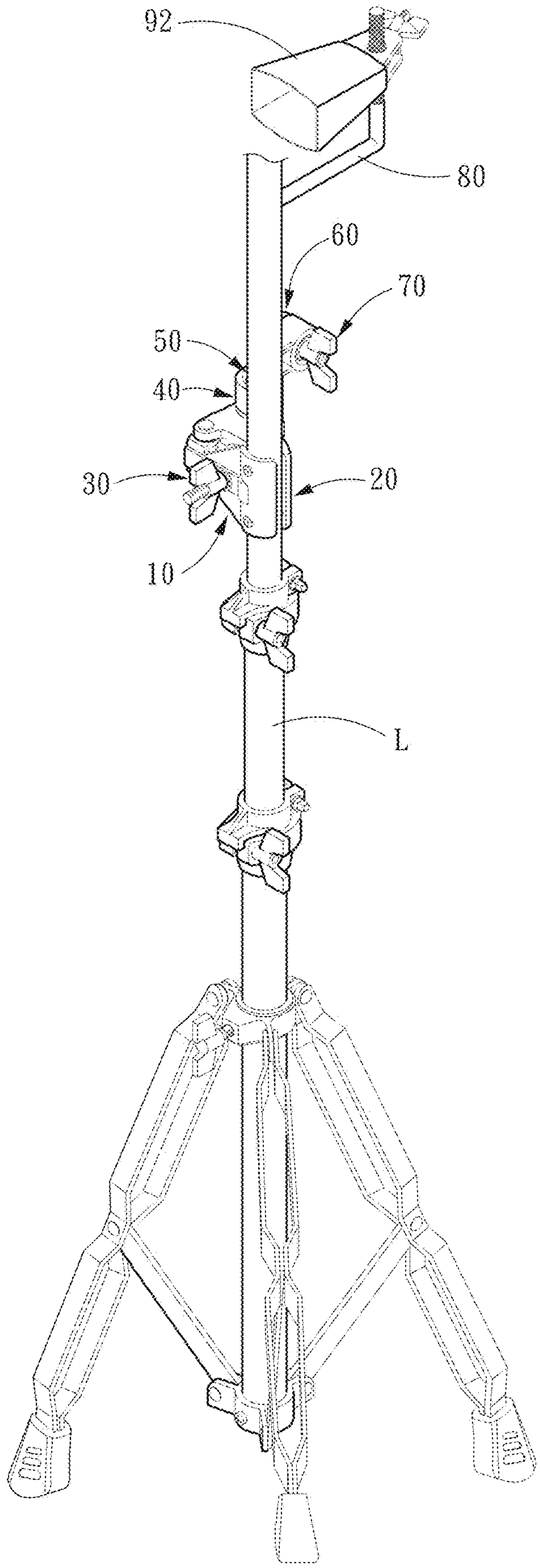
FIG. 4 is a second schematic view for use of the present invention.
Figure 5:
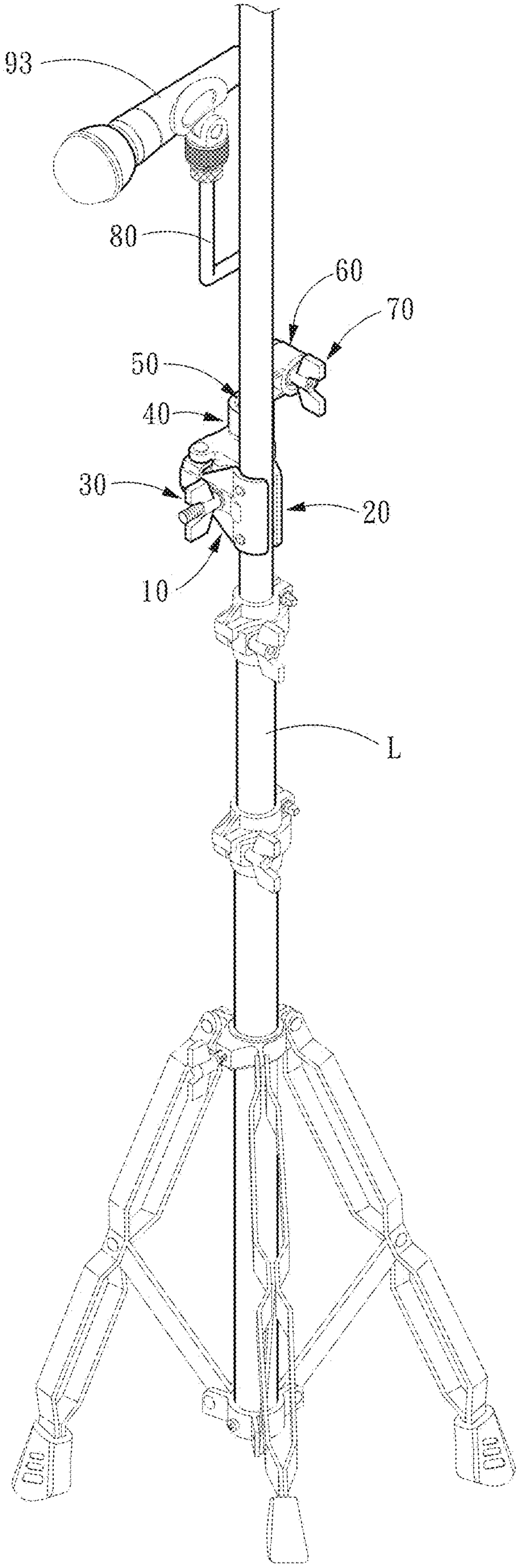
FIG. 5 is a third schematic view for use of the present invention.

Please refer to FIG. 3, FIG. 4, and FIG. 5, the first clamping block 10 and the second clamping block 20 of the present invention sandwich the vertical rod L, and the mounting rod 80 can be used install various musical instruments or auxiliary equipment, such as a cymbal 91 as shown in FIG. 3, a cowbell 92 as shown in FIG. 4, or a microphone 93 as shown in FIG. 5.

As mentioned above, the present invention has characteristics as follows:

1. The mounting rod can be used to set up various musical instruments or auxiliary equipment, and has degrees of rotational freedom in two directions through the vertical rotating joint and the horizontal rotating joint, so the tilt angle can be freely adjusted.
2. In order to press the first clamping block and the second clamping block closer together through the first screw locking head and the first bolt, so that the first clamping surface and the second clamping surface sandwich the vertical rod, Once the first screw locking head and the first bolt are damaged, which can be directly replaced to increase the service life.

What is claimed is:

1. A clamping rod frame provided for clamping a vertical rod, comprising:

a first clamping block, comprising a first clamping surface adjacent to the vertical rod;

a second clamping block, comprising a second clamping surface adjacent to the vertical rod, the first clamping block and the second clamping block pivotally connected together through a pivot so that the first clamping block and the second clamping block rotate relative to each other to allow the first clamping surface and the second clamping surface close together, the first clamping block comprising a first through hole, and the second clamping block comprising a second through hole corresponded to the first through hole;

a first locking member, comprising a first screw locking head and a first bolt, the first bolt passing through the second through hole and the first through hole and being screw locked with the first screw locking head, the first screw locking head and the first bolt pressing the first clamping block close to the second clamping block, so that the vertical rod is sandwiched between the first clamping surface and the second clamping surface;

a vertical rotating joint, comprising a first vertical joint and a second vertical joint overlapping and relatively rotating to each other, and the first vertical joint connected to the second clamping block;

a second locking member, comprising a second screw locking head and a second bolt, the second bolt passing through the second vertical joint and the first vertical joint and being screw locked with the second screw locking head, and the second screw locking head and the second bolt pressing the first vertical joint and the second vertical joint to clamp and fix each other;

a horizontal rotating joint, comprising a first horizontal joint and a second horizontal joint overlapping and relatively rotating to each other, and the first horizontal joint connected to the second vertical joint;

a third locking member, comprising a third screw locking head and a third bolt, the third bolt passing through the second horizontal joint and the first horizontal joint and being screw locked with the third screw locking head, the third screw locking head and the third bolt pressing the first horizontal joint and the second horizontal joint to clamp and fix each other, and the third bolt provided with a mounting ring at an end opposite to the third screw locking head, the second horizontal joint provided with an accommodating slot and a groove, the accommodating slot correspondingly accommodating the mounting ring, the groove crossing the accommodation slot and penetrating the second horizontal joint, and the groove in a direction identical to an axial direction of the mounting ring; and a mounting rod, inserted into the mounting ring and pressed and fixed by the groove when the first horizontal joint and second horizontal joint are clamped.

2. The clamping rod frame according to claim 1, wherein the first clamping surface and the second clamping surface are respectively provided with a plurality of clamping soft pads.

3. The clamping rod frame according to claim 2, wherein the first clamping surface and the second clamping surface are respectively provided with a plurality of through holes, and the plurality of clamping soft pads of the first clamping surface and the second clamping surface are respectively provided with a protruding post to engage with each of the plurality of through holes.

4. The clamping rod frame according to claim 1, wherein the first bolt is inserted into a conical spring, and a conical direction of the conical spring is toward the first screw locking head.

5. The clamping rod frame according to claim 1, wherein the second bolt and the third bolt are respectively inserted into a compression spring.

6. The clamping rod frame according to claim 1, wherein the first screw locking head, the second screw locking head and the third screw locking head respectively press the first clamping block, the first vertical joint and the first horizontal joint by a baffle.

7. The clamping rod frame according to claim 1, wherein the second through hole is rectangular, and the first bolt is provided with a rectangular block to engage with the second through hole correspondingly.

8. The clamping rod frame according to claim 1, wherein the first through hole is an elongated hole.

9. The clamping rod frame according to claim 1, wherein contact surfaces of the first vertical joint and the second vertical joint are respectively provided with a first concave and convex engaging structure.

10. The clamping rod frame according to claim 1, wherein contact surfaces of the first horizontal joint and the second horizontal joint are respectively provided with a second concave and convex engaging structure.

* * * * *